US012749923B2

(12) United States Patent
Kim et al.

(10) Patent No.: US 12,749,923 B2
(45) Date of Patent: Sep. 29, 2026

(54) SYSTEM FOR REMOTE WIRELESS CHARGING FOR ELECTRIC VEHICLE USING OOFDMA AND RISLEY PRISMS

(71) Applicant: INDUSTRY ACADEMIC COOPERATION FOUNDATION OF YEUNGNAM UNIVERSITY, Gyeongsan-si (KR)

(72) Inventors: Gunzung Kim, Gyeongsan-si (KR); Jeongsook Eom, Gwangju (KR); Yong Wan Park, Daegu (KR)

(73) Assignee: Industry Academic Cooperation Foundation of Yeungnam University, Gyeongsan-si (KR)

( * ) Notice: Subject to any disclaimer, the term of this patent is extended or adjusted under 35 U.S.C. 154(b) by 650 days.

(21) Appl. No.: 18/366,161

(22) Filed: Aug. 7, 2023

(65) Prior Publication Data

US 2024/0405610 A1 Dec. 5, 2024

(30) Foreign Application Priority Data

May 31, 2023 (KR) ........................ 10-2023-0069999

(51) Int. Cl.
*H02J 50/30* (2016.01)
*B60L 53/10* (2019.01)
(Continued)

(52) U.S. Cl.
CPC .............. *H02J 50/30* (2016.02); *B60L 53/10* (2019.02); *B60L 53/66* (2019.02); *H02J 50/80* (2016.02); *G02B 26/0891* (2013.01)

(58) Field of Classification Search
CPC .. H02J 50/30; H02J 50/80; H02J 50/40; H02J 50/90; B60L 53/10; B60L 53/66;
(Continued)

(56) References Cited

U.S. PATENT DOCUMENTS

2013/0088093 A1* 4/2013 Aschenbroich ......... H02J 13/00 307/112
2020/0370890 A1* 11/2020 Hamilton ................. G08G 1/04
(Continued)

FOREIGN PATENT DOCUMENTS

KR 10-2013-0098071 A 9/2013
KR 10-2019-0136361 A 12/2019
WO 2019-165293 A1 8/2019

OTHER PUBLICATIONS

Gunzung Kim et al., "Optical wireless power path configuration based on DS-OCDMA technique", 2021 International Conference on Information and Communication Technology Convergence (ICTC), 2021, IEEE, pp. 1194-1197.

*Primary Examiner* — Huy Q Phan
(74) *Attorney, Agent, or Firm* — You & IP, LLC

(57) ABSTRACT

A system for remote wireless charging for an electric vehicle using OOFDMA and Risley prisms is proposed. The system includes a receiver configured to transmit location of the receiver and photovoltaic panel size information as a power request signal through V2I, and a transmitter configured to control power transmission based on the information on the power request signal, control a distance between the prisms according to the location of the receiver and the size of a photovoltaic panel, transmit transmission power information (PowerInfo) for all laser signals to be received by the photovoltaic panel, and rotate the Risley prisms by a predetermined angle, wherein the transmitter, after generating the transmission power information for each wavelength by OOFDM, transmits the signals to areas where the power transmission is available when the prisms are rotated by the predetermined angle, thereby reducing time to find exact locations of the receiver and photovoltaic panel.

5 Claims, 4 Drawing Sheets

(51) Int. Cl.
*B60L 53/66* (2019.01)
*H02J 50/80* (2016.01)
*G02B 26/08* (2006.01)

(58) Field of Classification Search
CPC .......... B60L 53/35; B60L 53/51; B60L 53/62; G02B 26/0891; Y02T 90/12
USPC .......................................................... 320/109
See application file for complete search history.

(56) References Cited

U.S. PATENT DOCUMENTS

2020/0381955 A1* 12/2020 Soryal .................... H02J 50/30
2022/0209584 A1 6/2022 Glover et al.

* cited by examiner

SYSTEM FOR REMOTE WIRELESS CHARGING FOR ELECTRIC VEHICLE USING OOFDMA AND RISLEY PRISMS

CROSS REFERENCE TO RELATED APPLICATION

The present application claims priority to Korean Patent Application No. 10-2023-0069999, filed May 31, 2023, the entire contents of which is incorporated herein for all purposes by this reference.

BACKGROUND OF THE INVENTION

Field of the Invention

The present disclosure relates to a system for remote wireless charging for an electric vehicle using OOFDMA and Risley prisms and, more particularly, to a system for remote wireless charging for an electric vehicle using OOFDMA and Risley prisms, wherein the system uses the OOFDMA and the Risley prisms for transmitting pilot signals in multiple directions simultaneously by using OOFDM, WDMA, and the Risley prisms.

Description of the Related Art

In a conventional method for supplying electric power to an electric vehicle by using HILPB, when a PRX sends, along with its location on GPS, a request for the electric power, each PTX transmits pilot signals limited to laser intensity of MPE Class 1 in all directions where the electric power supply is available and the PRX estimates maximum received power from the pilot signals, and selects a PTX having the highest power supply efficiency on the basis of this estimation.

Here, High Intensity Laser Power Beaming (HILPB) is a technology for transmitting electric power by using a high-intensity laser, and is operated in a method of wirelessly transmitting the power from a remote location by using a laser beam in order to supply the power to an electric vehicle. In addition, PRX is an abbreviation of Power Receiver, and refers to a device in an electric vehicle and for receiving electric power. The PRX will send, along with its location on GPS, a request for required electric power. PTX is an abbreviation of Power Transmitter, and refers to a device for supplying the electric power. The PTX transmits pilot signals limited to laser intensity of MPE Class 1 in all directions where the electric power supply is available. MPE is an abbreviation of Maximum Permissible Exposure, and refers to maximum permissible exposure. MPE Class 1 means an output level of a laser device and represents a class for limiting laser intensity to a predetermined level for safe use. The laser intensity of MPE Class 1 is used as a pilot signal for safe wireless power supply.

Due to GPS errors, an exact location of a PRX as well as an exact location of a photovoltaic panel mounted are unknown. The photovoltaic panel has the highest efficiency when HILPB is supplied to the most central part thereof, so the PTX transmits pilot signals in all directions in which the HILPB is transmittable in order to accurately find the central part of the photovoltaic panel mounted on the PRX, and the PTX selects the directions in which the largest power may be received through converting the pilot signals into the electric power.

Since each pilot signal is able to be transmitted in one direction at a time, the number of directions in which pilot signals are transmitted increases in proportion to directions in which a power supply unit (PTX) transmits HILPBS. Accordingly, a time for transmitting the pilot signals is increased, and a time for transmitting the HILPBs is shortened by the time for transmitting the pilot signals. Since a staying time at crossroads is limited, it is required to shorten a time to find an exact location of a PRX and a photovoltaic panel in order to receive much power.

DOCUMENTS OF RELATED ART

Patent Documents (Patent Document 1) Korean Patent Application Publication 2019-0136361 (Dec. 10, 2019)

SUMMARY OF THE INVENTION

An objective of the present disclosure is to provide a system for remote wireless charging for an electric vehicle using OOFDMA and Risley prisms, wherein a time to find an exact location of a PRX and a photovoltaic panel is shortened.

According to the present disclosure, there is provided a system for remote wireless charging for an electric vehicle using OOFDMA and Risley prisms, the system including: a receiver configured to transmit location of the receiver and photovoltaic panel size information as a power request signal through V2I; and a transmitter configured to control power transmission based on the information on the power request signal, control a distance between the prisms according to the location of the receiver and the size of a photovoltaic panel, transmit transmission power information (PowerInfo) for all laser signals to be received by the photovoltaic panel, and rotate the Risley prisms by a predetermined angle, wherein, the transmitter, after generating the transmission power information for each wavelength by OOFDM, may transmit the signals to areas where the power transmission is available when the prisms are rotated by the predetermined angle.

When the transmitter generates the transmission power information for each wavelength by the OOFDM and then transmits the transmission power information to the prisms, pilot signals may be simultaneously transmitted in multiple directions due to a difference in laser refractive indices in the wavelengths.

The receiver may determine a location of a laser by analyzing the transmission power information received from the transmitter, and predict maximum receivable power.

The receiver may receive the power through a laser power beam (HILPB) by selecting a plurality of transmitters capable of supplying required power.

In addition, the receiver may identify positions of Power IDs relatively closest to a middle of a PV array by using Device IDs in the transmission power information of the transmitter, calculate a distance between the transmitter and the PV array and/or a reception angle by using a distribution of the Power IDs, and select the transmitter as a power supply source.

According to the present disclosure, there is an effect of shortening the time to find the exact location of the receiver (i.e., the PRX) and the photovoltaic panel.

DETAILED DESCRIPTION OF THE INVENTION

Figure 1:
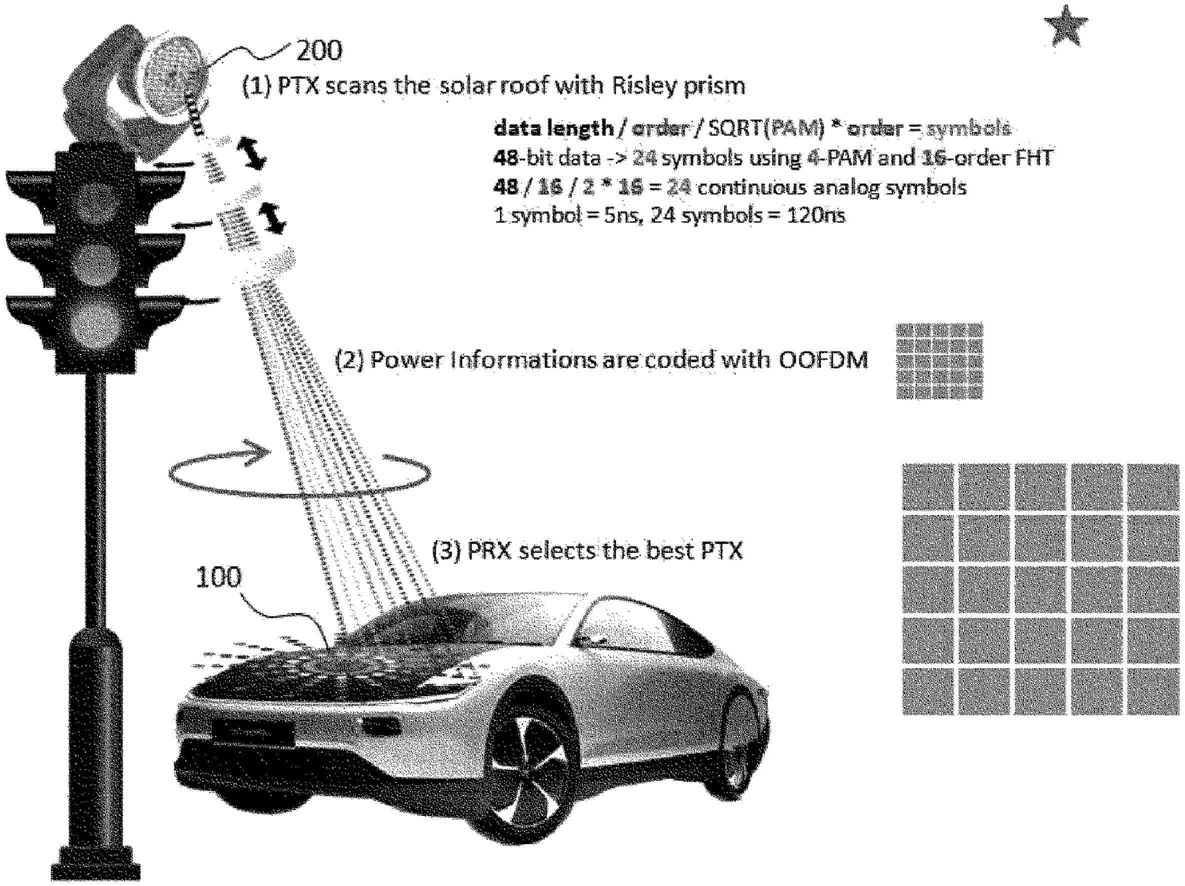
FIG. 1 is a view illustrating a system for remote wireless charging of an electric vehicle, the system transmitting pilot signals in multiple directions simultaneously by using OOFDM, WDMA, and Risley prisms according to an exemplary embodiment of the present disclosure.

FIG. 1 is a view illustrating a system for remote wireless charging of an electric vehicle, the system transmitting pilot signals in multiple directions simultaneously by using OOFDM, WDMA, and Risley prisms according to an exemplary embodiment of the present disclosure.

As shown in FIG. 1, the system for remote wireless charging for the electric vehicle using the OOFDMA and Risley prisms, includes: a receiver 100 configured to transmit location of the receiver and photovoltaic panel size information as a power request signal through V2I; and a transmitter 200 configured to control power transmission based on the information received from the power request signal, control a distance between prisms according to the location of the receiver and the size of a photovoltaic panel, transmit transmission power information (PowerInfo) for all laser signals to be received by the photovoltaic panel, and rotate the Risley prisms by a predetermined angle. Such a transmitter 200, after generating information on the transmission power for each wavelength by OOFDM, transmits signals to areas where power transmission is available when the prisms are rotated by the predetermined angle.

In the transmitter according to the present exemplary embodiment, when the information on the transmission power for each wavelength is generated by OOFDM and then transmitted to the prisms, pilot signals are simultaneously transmitted in multiple directions due to a difference in laser refractive indices in the wavelengths. Such a transmitter uses the prisms to transmit the signals over a wide area. When the prisms rotate 360 degrees only once, the signals are transmitted to the areas where the power transmission is available. It is sufficient when only one signal is reachable to a PV cell, and a large wavelength interval and a large rotation interval are used.

The system for remote wireless charging for the electric vehicle using the OOFDMA and Risley prisms according to the present exemplary embodiment assigns a unique Device ID to each transmitter and assigns a unique Power ID to each angle and wavelength. A receiving side uses only Device IDs and Power IDs and excludes each RSSI. In this regard, due to the characteristics of OOFDM and various wavelengths, each RSSI is not constant and continuously changes. This is the reason why only the Device IDs and Power IDs are used at the receiving side in the exemplary embodiment of the present disclosure even though an optimal power supply source is selected by using an RSSI in the related art. Here, RSSI is an abbreviation of "Received Signal Strength Indicator", and is an indicator for indicating the strength of a received signal in a wireless communication system. An RSSI is measured in a device in which a radio signal is received, and is usually expressed in decibel milliwatts (dBm). In the wireless communication system, this signal strength may be measured to determine signal quality of communication, or may be used to select an optimal power supply source. That is, in the related art, a method of selecting the optimal power supply source by using the RSSI has been applied. However, in the exemplary embodiment of the present disclosure, since each RSSI is not constant and continuously changes due to the characteristics of OOFDM and various wavelengths, the receiving side uses only the Device IDs and Power IDs excluding each RSSI. A Device ID is an identifier uniquely assigned to each transmitter, and a Power ID is an identifier uniquely assigned to each wavelength. In this way, the receiving side may identify and select each power supply source through the indicator without being affected by signal intensity fluctuations.

In addition, the receiver according to the present exemplary embodiment analyzes the information about the transmission power received from the transmitter to identify a location of a laser, predicts maximum receivable power, and receives the power through a laser power beam (i.e., High Intensity Laser Power Beaming (HILPB)) by selecting a plurality of transmitters capable of supplying required power.

For reference, HILPB uses a high-power laser system to concentrate power into a form of beam. This laser beam maintains its energy while traveling through the air and transmits the power towards a receiver or receiving device. The receiver may receive and convert this power to use or store the power as electrical energy. The key to HILPB is the concentration of high-intensity laser beam. A beam is generated by using a high-power laser, and the laser beam is effectively concentrated so that the power is transmitted to a remote location. To this end, an optical system and a tracking system may be used to maximally reduce the loss of a reflection path and to maintain the stability of beam. The HILPB may be used to supply the power in remote areas or places with limited mobility. The HILPB may be used in various application fields such as electric vehicle charging, power supply of space exploration equipment, and remote operations of meters. Through wireless power transmission, the limitations of cable connection is overcome and efficient and convenient power supply is enabled.

In addition, the receiver identifies positions of Power IDs relatively closest to the middle of a PV array by using Device IDs in the transmission power information of transmitters, uses a distribution of the Power IDs to calculate reception angles and/or distances between the transmitters and the PV array, and selects a relevant transmitter as a power supply source.

The receiver according to the present exemplary embodiment may recognize and/or select a Power ID closest to the middle of the PV array by using the received Power IDs to identify the positions of the received Power IDs on the PV array. In addition, by using a Power ID distribution, the reception angle and/or the distances between the transmitters and the PV array are calculated to select an optimal transmitter.

In the exemplary embodiment of the present disclosure, OOFDMA is a compound word, expressing Optical Orthogonal Frequency Division Multiplexing (OOFDM) and Wavelength Division Multiple Access (WDMA). The OOFDMA combines multiple frequency bands of OOFDM and multiple access of WDMA, and may enable efficient data transmission between multiple users.

The OOFDM according to the present exemplary embodiment undergoes a more complicated signal process than OCDMA using a unipolar method, but generates 48-bit power information as 24 optical signals, whereby more power information may be transmitted in a short time.

In addition, WDMA is an optical communication method for simultaneously using multiple laser wavelengths, and is capable of transmitting and receiving optical signals at the same time in proportion to the number of wavelengths in use.

In addition, Risley prisms have several prisms using a same central axis, but vary characteristics, refractive indices, and rotational speeds thereof to enable generating patterns of various intervals and shapes.

Accordingly, in the system for remote wireless charging for the electric vehicle according to the present exemplary embodiment, when the system generates information on PTX transmission power for each wavelength by OOFDM and then transmits the information to the prisms, pilot signals may be simultaneously transmitted in multiple directions due to a difference between laser refractive indices in the wavelengths.

The system for remote wireless charging for the electric vehicle using the OOFDMA and Risley prisms according to the exemplary embodiment of the present disclosure relates to a remote wireless charging system for transmitting pilot signals in multiple directions simultaneously by using OOFDM, WDMA, and Risley prisms, wherein, when the system generates information on PTX transmission power for each wavelength by the OOFDM, and then transmits the information to the prisms, pilot signals may be simultaneously transmitted in multiple directions due to a difference between laser refractive indices according to wavelengths, thereby enabling the pilot signals to be transmitted in more directions in a shorter time by using the above three optical technologies simultaneously.

Figure 2:
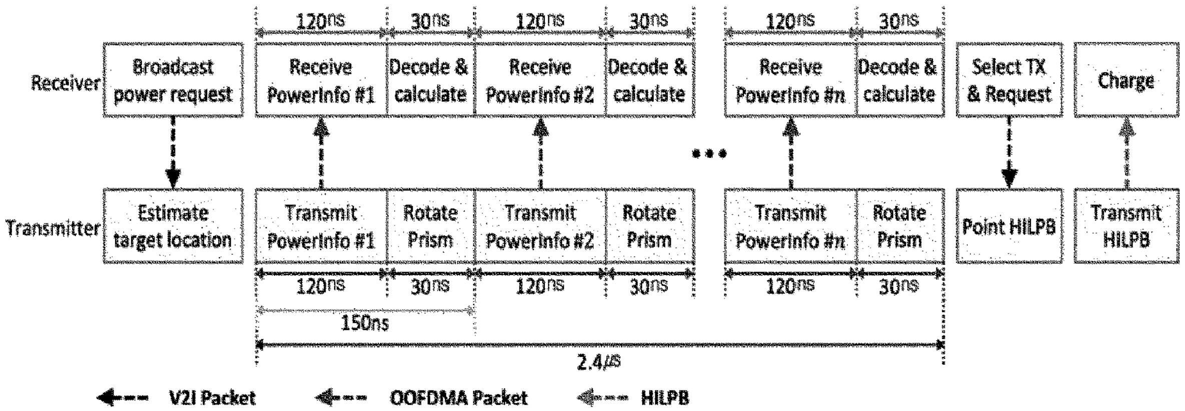
FIG. 2 is a view describing an operation of the system for remote wireless charging for the electric vehicle using the OOFDMA and Risley prisms according to the exemplary embodiment of the present disclosure.

FIG. 2 is a view describing an operation of the system for remote wireless charging for the electric vehicle using the OOFDMA and Risley prisms according to the exemplary embodiment of the present disclosure.

An electric vehicle (EV) arrives at crossroads and stops to wait for a traffic signal. In this case, in order to receive power, the system for remote wireless charging for the electric vehicle using the OOFDMA and Risley prisms according to the exemplary embodiment broadcasts power request signals including its location information and photovoltaic panel size information to the surroundings by using V2I. Here, V2I is an abbreviation of Vehicle-to-Infrastructure, and represents communication between vehicles and infrastructure. The V2I refers to technology for exchanging and transmitting information and data between the vehicles and road infrastructure facilities. Through this technology, the vehicles may perform various functions, such as road safety, operational efficiency, and service improvement through interaction with the infrastructure. The V2I may improve the safety and convenience of vehicles through the communication with the infrastructure facilities such as traffic lights, street lights, highway toll systems, and parking lot management systems.

PTXs, which are power supply devices located at crossroads together with lights such as traffic lights or streetlights, receive power request signals through V2I. Each PTX generates PowerInfo by combining pieces of information including: a Device ID for indicating a unique number to identify a power supply device; an Angle ID for indicating a rotation angle with respect to a center part of each prism; Max Power for indicating transmittable maximum power; and CRC for determining data loss.

Each transmitter PTX controls a distance between the prisms according to a location of a receiver PRX and a size of a photovoltaic panel, and transmits the PowerInfo so that all laser beams refracted through the prisms are received by the photovoltaic panel.

After transmitting the PowerInfo, each transmitter PTX rotates the Risley prisms by a predetermined angle.

Each receiver PRX analyzes the PowerInfo received by the photovoltaic panel, identifies a position of each laser wavelength with respect to the center part of the photovoltaic panel, and on the basis of this, predicts maximum receivable power.

Here, PowerInfo equals to Device ID+Angle ID+Power ID+Max Power+CRC, and 48-bit=4PAM*16Subchannels=24Symbols.

The receiver PRX selects a transmitter PTX, so as to receive required power on the basis of power received and predicted for a predetermined period of time. The power may be received from one or more transmitters (PTXs) through HILPB, whereby, in a case where sufficient power is not supplied from one transmitter PTX, the power may be supplied by selecting several transmitters PTXs at the same time.

Figure 3:
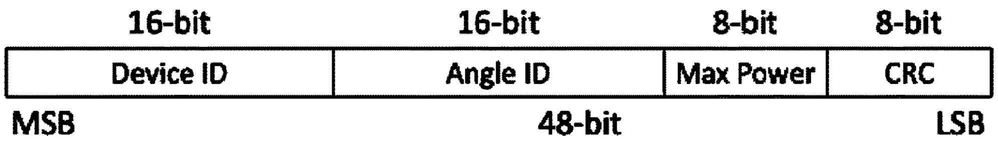
FIG. 3 is a view illustrating a pilot signal used in a PTX of the system for remote wireless charging for the electric vehicle using the OOFDMA and Risley prisms according to the exemplary embodiment of the present disclosure.

FIG. 3 is a view illustrating a pilot signal used in the transmitter PTX of the system for remote wireless charging for the electric vehicle using the OOFDMA and Risley prisms according to the exemplary embodiment of the present disclosure.

The pilot signal used by the transmitter PTX consists of four parts: Device ID, Angle ID, Max power, and CRC.

A Device ID uses 16 bits as a unique number for identifying a PTX.

Risley prisms are composed of three wedge prisms each having one side thereof thick and the other side thereof thin.

Central axes of all three prisms coincide, and various scanning patterns are generated while the three prisms rotate independently to each other with respect to the central axes.

An Angle ID represents, as a 16-bit, a rotation angle of each prism with respect to the central axes in the Risley prisms.

Max power represents maximum power of a Continuous Wave (CW) laser transmittable from a PTX in units of w (watts), and uses eight bits.

Cyclic Redundancy Check (CRC) generates 8-bit checksum data by using CRC-8 for 40 bits corresponding to the bits of the Device ID, Angle ID, and Max power. A PRX generates a checksum by using CRC-8 for the received 40 bits, and compares the checksum with the received 8 bits of CRC to confirm whether data corruption occurs during data transmission.

In FIG. 3, MSB is an abbreviation of "Most Significant Bit", and means a bit representing the highest digit value. This MSB is the leftmost bit in a binary number. For example, in an 8-bit binary number 11011010, the leftmost bit, which is 1, is the MSB.

LSB is an abbreviation of "Least Significant Bit", and means a bit representing the lowest digit value. This LSB is the rightmost bit in a binary number. For example, in the 8-bit binary number 11011010, the rightmost bit, which is 0, is the LSB. The MSB and LSB indicate positions and significance in a bit string, and may affect the interpretation and expression of data.

Figure 4:
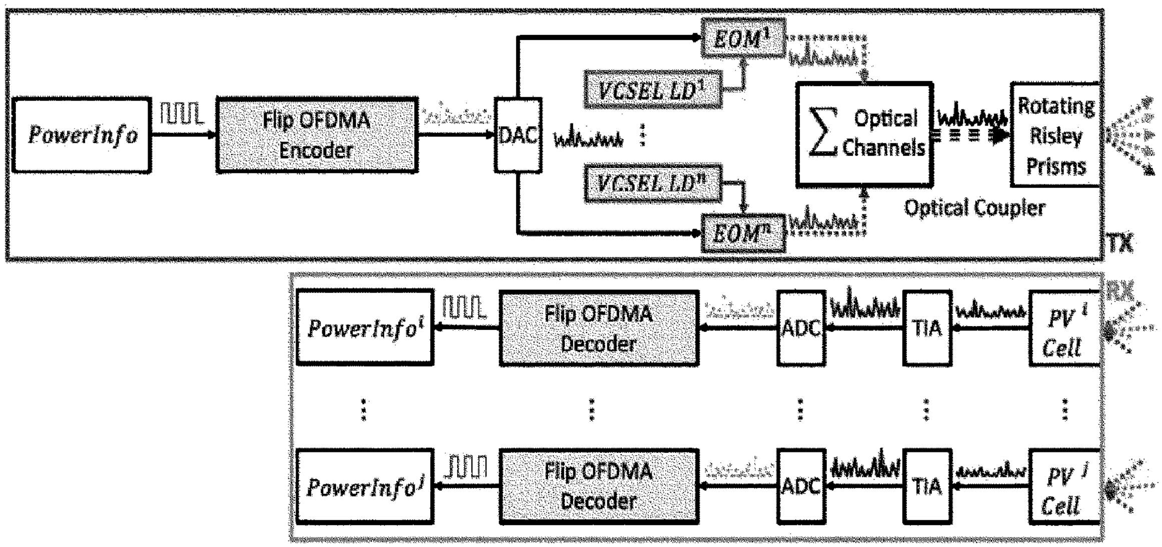
FIG. 4 is a view describing a detailed configuration and operation of the system for remote wireless charging for the electric vehicle using the OOFDMA and Risley prisms according to the exemplary embodiment of the present disclosure.

FIG. 4 is a view describing a detailed configuration and operation of the system for remote wireless charging for the electric vehicle using the OOFDMA and Risley prisms according to the exemplary embodiment of the present disclosure.

In a configuration of the Risley prisms of the system for remote wireless charging for the electric vehicle using the OOFDMA and Risley prisms according to the present exemplary embodiment, a spacing control device controls a spacing between the Risley prisms according to a distance between a PTX and a PRX and a size of a photovoltaic panel. In this case, when the distance between the PTX and PRX is close or the size of the photovoltaic panel is large, a size of a pattern is made to be increased by making the spacing between the prisms to be close. Conversely, when the distance between the PTX and PRX is long or the size of the photovoltaic panel is small, the size of the pattern is made to be reduced by making the spacing between the prisms to be far.

An RTX according to the present exemplary embodiment performs encoding of PowerInfo, which is a pilot signal, by using a flip OFDMA technique to convert the PowerInfo into a signal to be used for transmission. Thereafter, an analog signal generated by using a DAC is used to generate an analog laser by using an External Optical Modulator (EOM) and a laser diode (LD).

Analog laser signals generated by simultaneously performing the same operation at multiple laser wavelengths are combined into one signal through an optical coupler. The laser signal transmitted to the Risley prisms is refracted according to wavelengths whenever passing through the prisms, and then transmitted.

After transmitting the laser signal, the Risley prisms are rotated by a predetermined angle.

The PRX converts the laser signal received by using the photovoltaic panel into an analog signal by using a TIA, and converts the analog signal into a digital signal by using an ADC. Decoding is performed by using a Flip OFDMA technique to generate the PowerInfo.

After all pieces of PowerInfo transmitted by the PTXs at various angles are received, a PTX having the largest number of identical Device IDs and Angle IDs is selected. A ratio of the number of Device IDs received by the PRX to the number of Device IDs transmitted by the PTX indicates a reception rate at which the transmitted HILPBs are arrived at or received by the PV panel. This means that the larger the number of identical Device IDs and Angle IDs, the greater HILPBs received by the photovoltaic panel.

When the Max power and the reception rate are used, maximum receivable power may be predicted.

An Angle ID indicates whether a central axis of prisms coincides with a central axis of a PV panel or not. When the central axis of the prisms is moved in a direction having many identical Angle IDs, a probability in which the above two central axes coincide is increased.

When a receivable light amount is not exceeded, a photovoltaic panel is usable in power conversion for all the received HILPBs. In a case where power received from one PTX is insufficient, several PTXs may be selected to receive the power as required.

Figure 5:
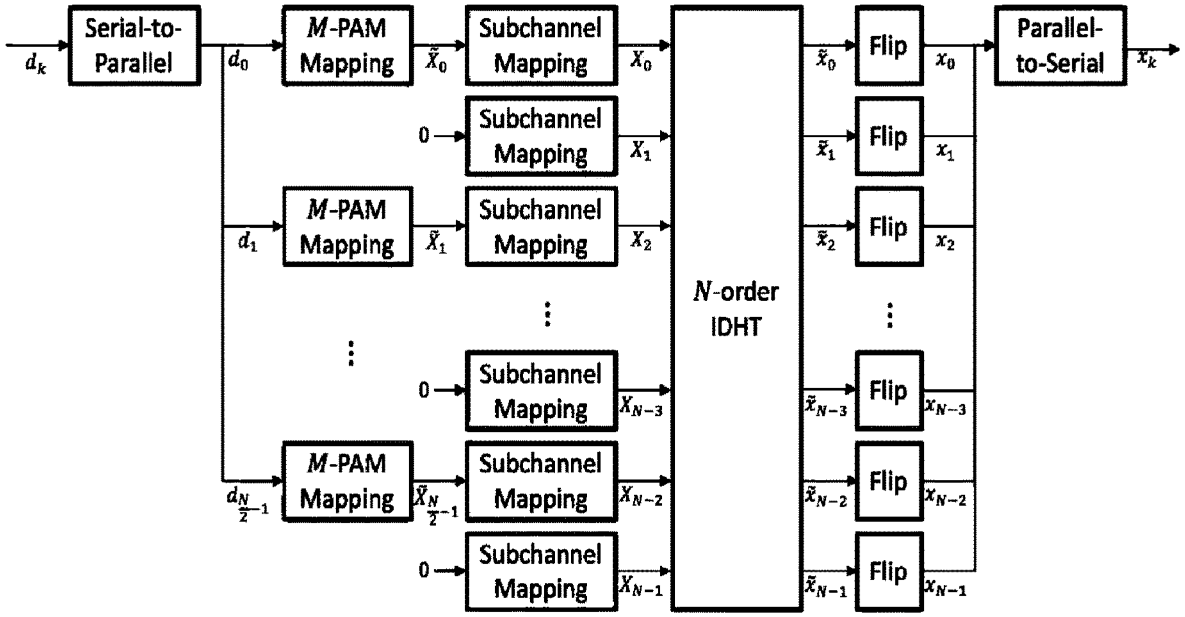
FIG. 5 is a view describing a Flip OFDMA encoder of the system for remote wireless charging for the electric vehicle using the OOFDMA and Risley prisms according to the exemplary embodiment of the present disclosure.

FIG. 5 is a view describing a Flip OFDMA encoder of the system for remote wireless charging for the electric vehicle using the OOFDMA and Risley prisms according to the exemplary embodiment of the present disclosure.

As shown in FIG. 5, the Flip OFDMA encoder according to the present exemplary embodiment performs processes of parallel conversion (serial-to-parallel), multi-amplitude conditional encoding mapping (M-PAM Mapping), subchannel N-order inverse discrete Hartley Transform (N-order IDHT), reverse modulation (Flip), and serial conversion (parallel-to-serial).

The parallel conversion (serial-to-parallel) is a process of converting data transmitted in serial form into parallel form. This process means converting the data into the parallel form capable of processing multiple bits of data simultaneously.

The multi-amplitude conditional encoding mapping (M-PAM Mapping) is a mapping process of multi-amplitude conditional encoding (i.e., multi-pulse amplitude modulation). This is a process of converting digital data into a multi-amplitude signal, wherein input bits are converted to make correspond to several amplitude levels.

The subchannel mapping is a process of dividing data by using several subchannels in a multiple access method. This process may be used in frequency division multiple access (FDMA), time division multiple access (TDMA), or the like.

The N-order inverse discrete Hartley Transform (N-order IDHT) is an N-order inverse discrete Fourier Transform, and is a process of transforming a given frequency domain signal into a time domain. The N-order inverse discrete Fourier transform is used to reconstruct a time-domain signal in N-dimensional space.

The reverse modulation (Flip) is a reverse modulation process, and means a process of reversing an order of data to its original order. This means to process an operation previously performed in a reverse order.

The serial conversion (parallel-to-serial) is a process of converting parallel data into serial data. This means to convert several pieces of data into serial form by listing the pieces of data in a row.

Figure 6:
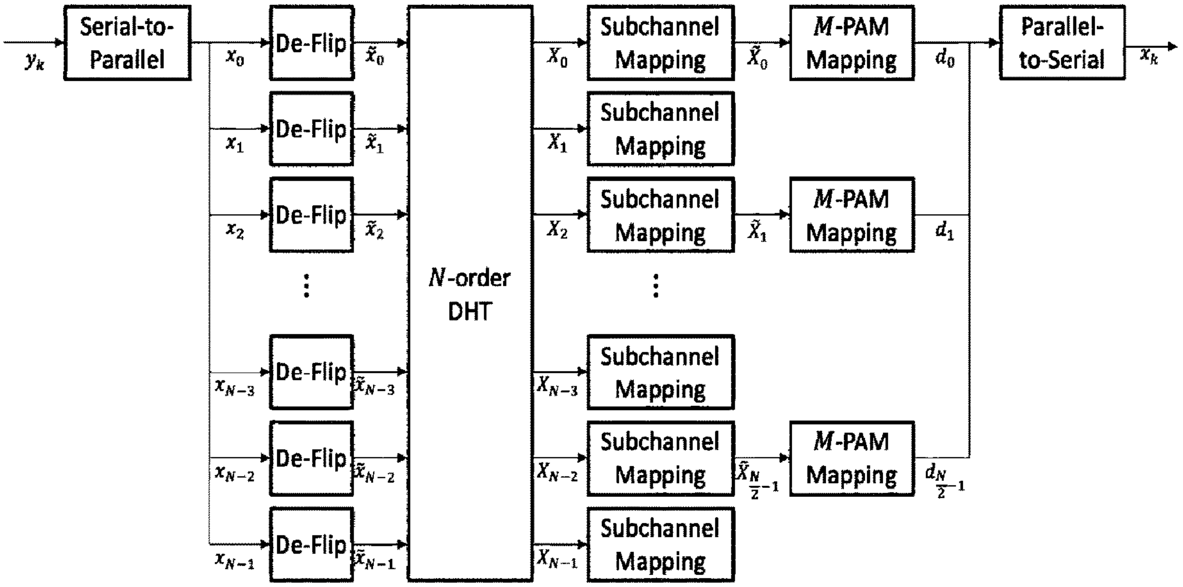
FIG. 6 is a view describing a Flip OFDMA decoder of the system for remote wireless charging for the electric vehicle using the OOFDMA and Risley prisms according to the exemplary embodiment of the present disclosure.

FIG. 6 is a view describing a Flip OFDMA decoder of the system for remote wireless charging for the electric vehicle using the OOFDMA and Risley prisms according to the exemplary embodiment of the present disclosure.

The Flip OFDMA decoder according to the present exemplary embodiment performs processes of parallel conversion (serial-to-parallel), modulation (Flip), N-order discrete Hartley transform (N-order IDHT), subchannel mapping, multi-amplitude conditional encoding mapping (M-PAM Mapping), and serial conversion (parallel-to-serial).

Here, the parallel conversion (serial-to-parallel) is a process of converting data transmitted in serial form into parallel form. This process may be used to increase data transmission speed. In serial data, only one bit is transmitted at a time, but in parallel data, multiple bits may be transmitted simultaneously.

The modulation (De-Flip) is a process of operating the above-described flip process in a reverse order. The Flip is a process of modulating data in a specific method, and the De-Flip serves to return this modulated data to its original form.

The N-order discrete Hartley transform (N-order DHT) is one of transformation technologies used in digital signal processing. The DHT transforms a signal in a time domain to a frequency domain. The N-order DHT means transforming a given signal by using an N-dimensional Hartley transform.

The subchannel mapping means that data is allocated from multiplexed transport channels to subchannels. The data is transmitted and processed by mapping the transport channels divided in various dimensions, such as frequency or time, to the subchannels.

The multi-amplitude conditional encoding mapping (M-PAM Mapping) is a multiple-base pulse amplitude modulation technique of M-ary Pulse Amplitude Modulation (M-PAM) mapping, and is a process of converting digital data into multiple symbols. In the M-PAM Mapping, data is mapped to different amplitude levels and transmitted, and a receiving side decodes the data again to restore the original data.

The serial conversion (parallel-to-serial) is a process of converting data transmitted in parallel form into serial form. In parallel data, multiple bits are transmitted simultaneously, but in serial data, only one bit is transmitted at a time. The parallel-to-serial conversion is used to convert data in parallel form into a processable form in data transmission, data storage, or the like.

Figure 7:
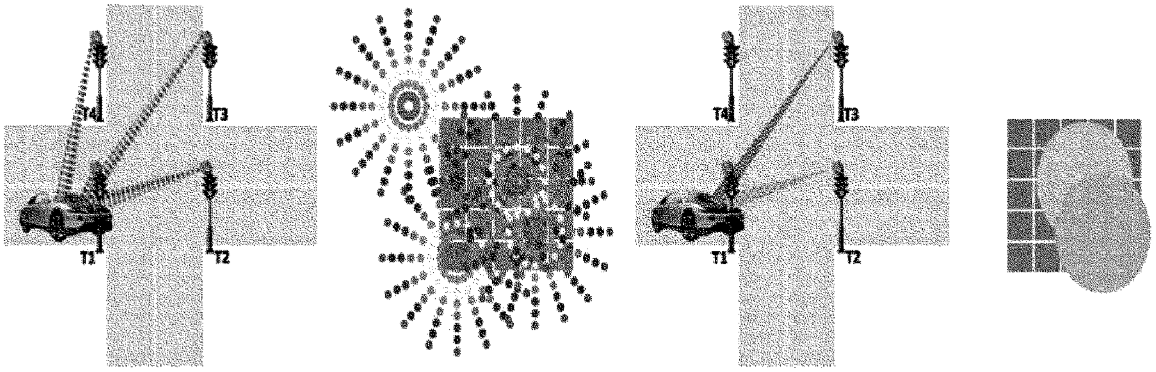
FIG. 7 is a conceptual view applied to crossroad traffic lights of the system for remote wireless charging for the electric vehicle using the OOFDMA and Risley prisms according to the exemplary embodiment of the present disclosure.

FIG. 7 is a conceptual view applied to crossroad traffic lights of the system for remote wireless charging for the electric vehicle using the OOFDMA and Risley prisms according to the exemplary embodiment of the present disclosure.

As shown in FIG. 7, in the system for remote wireless charging for the electric vehicle using the OOFDMA and Risley prisms according to the present exemplary embodiment, there is one traffic light at each corner of crossroads, and there is a PTX for supplying power with HILPB at each traffic light. An EV waits to receive signals at the crossroads, and a PRX mounted on the EV notifies its location and a position of a photovoltaic panel through V2I, and requests power supply.

Four PTXs transmit pilot signals by controlling respective prisms according to a distance to the photovoltaic panel and a size of the photovoltaic panel mounted on the EV. The pilot signals are transmitted from every angle where the power transmission is available. Depending on each PTX, both of the patterns and the number of pilot signals received by the photovoltaic panel are different due to errors of GPS and aiming.

In FIG. 7, a pilot signal transmitted from T3 is received by the photovoltaic panel the most, and a pilot signal transmitted from T2 is received next most plentifully. The central axis of the Risley prisms in T1 is received at a corner of the photovoltaic panel, so a part of a pilot signal is received by the photovoltaic panel.

In a case of T4, the central axis of the Risley prisms is deviated from the photovoltaic panel, so the smallest number of pilot signals is received by the photovoltaic panel.

The EV selects PTXs in which the most pilot signals are received, and requests power transmission. Each selected PTX transmits a HILPB to a central axis point of the prisms, which are used when transmitting pilot signals.

The EV converts the received HILPBs into electricity by using the photovoltaic panel, and charges a battery thereof. When the battery charge is over or the signal is changed, power interruption is notified through V2I. Upon receiving this notification, the PTXs stop the power transmission, and the EV moves toward a destination thereof.

The system for remote wireless charging for the electric vehicle using the OOFDMA and Risley prisms according to the exemplary embodiment of the present disclosure may be used not only for automobiles but also for aerial flying objects (i.e., mobility means) such as drones and UAMS.

What is claimed is:

1. A system for remote wireless charging for an electric vehicle using an optical orthogonal frequency division multiple access (OOFDMA) and Risley prisms, the system comprising:

a receiver configured to transmit location of the receiver and photovoltaic panel size information as a power request signal through a vehicle-to-infrastructure (V2I); and a transmitter configured to control power transmission based on the information on the power request signal, control a distance between the Risley prisms according to the location of the receiver and the size of a photovoltaic panel, transmit transmission power information (PowerInfo) for all laser signals to be received by the photovoltaic panel, and rotate the Risley prisms by a predetermined angle, wherein the transmitter, after generating the transmission power information for each wavelength by an optical orthogonal frequency division multiplexing (OOFDM), transmits the signals to areas where the power transmission is available when the Risley prisms are rotated by the predetermined angle.

2. The system of claim 1, wherein, when the transmitter generates the transmission power information for each wavelength by the OOFDM and then transmits the transmission power information to the Risley prisms, pilot signals are simultaneously transmitted in multiple directions due to a difference in laser refractive indices in the wavelengths.

3. The system of claim 1, wherein the receiver determines a location of a laser by analyzing the transmission power information received from the transmitter, and predicts maximum receivable power.

4. The system of claim 1, wherein the receiver receives the power through a high intensity laser power beam (HILPB) by selecting a plurality of transmitters capable of supplying required power.

5. The system of claim 1, wherein the receiver identifies positions of Power identifiers (IDs) relatively closest to a middle of a photovoltaic (PV) array by using Device identifiers (IDs) in the transmission power information of the transmitter, calculates a distance between the transmitter and the PV array and/or a reception angle by using a distribution of the Power IDs, and selects the transmitter as a power supply source.

* * * * *